(12) United States Patent
Matsuda (10) Patent No.: US 11,814,037 B2
(45) Date of Patent: Nov. 14, 2023

(54) ROUGH TERRAIN VEHICLE AND STORAGE MEDIUM

(71) Applicant: KAWASAKI MOTORS, LTD., Akashi (JP)

(72) Inventor: Yoshimoto Matsuda, Kobe (JP)

(73) Assignee: KAWASAKI MOTORS, LTD., Akashi (JP)

(*) Notice: Subject to any disclaimer, the term of this patent is extended or adjusted under 35 U.S.C. 154(b) by 74 days.

(21) Appl. No.: 17/137,124

(22) Filed: Dec. 29, 2020

(65) Prior Publication Data
US 2022/0203962 A1    Jun. 30, 2022

(51) Int. Cl.
| | | |
|---|---|---|
| *B60W 30/04* | (2006.01) | |
| *B60Q 9/00* | (2006.01) | |
| *B60W 50/14* | (2020.01) | |
| *B60W 30/095* | (2012.01) | |
| *B60W 40/13* | (2012.01) | |
| *B60W 40/06* | (2012.01) | |
| *B62D 49/00* | (2006.01) | |

(52) U.S. Cl.
CPC ......... *B60W 30/04* (2013.01); *B60Q 9/00* (2013.01); *B60W 30/0956* (2013.01); *B60W 40/06* (2013.01); *B60W 40/13* (2013.01); *B60W 50/14* (2013.01); *B60W 2300/152* (2013.01); *B62D 49/00* (2013.01)

(58) Field of Classification Search
CPC .. B60W 30/04; B60W 30/0956; B60W 40/06; B60W 40/13; B60W 50/14; B60W 2300/152; B60Q 9/00; B62D 49/00
See application file for complete search history.

(56) References Cited

U.S. PATENT DOCUMENTS

| | | | | |
|---|---|---|---|---|
| 6,139,120 A | * | 10/2000 | Fukada | B60T 8/246 701/72 |
| 8,108,104 B2 | * | 1/2012 | Hrovat | B60G 17/0162 280/5.509 |
| 2005/0134440 A1 | * | 6/2005 | Breed | G01S 17/931 701/45 |
| 2005/0203684 A1 | * | 9/2005 | Borgesson | B60K 35/00 701/1 |

(Continued)

FOREIGN PATENT DOCUMENTS

CA    3162488 A1 * 10/2015 ........... A61B 5/0002

OTHER PUBLICATIONS

A Vehicle Rollover Evaluation System Based on Enabling State (Year: 2021).*

(Continued)

*Primary Examiner* — Jeff A Burke
*Assistant Examiner* — Kyle T Johnson
(74) *Attorney, Agent, or Firm* — Alleman Hall Creasman & Tuttle LLP (57) ABSTRACT

A rough terrain vehicle includes: a vehicle body; a state detector mounted on the vehicle body and configured to detect a state of the vehicle; a control target mounted on the vehicle body and operable during driving of the vehicle; an estimator mounted on the vehicle body and configured to estimate a margin for overturning of the vehicle or for load on the vehicle based on a result of detection by the state detector; and a controller mounted on the vehicle body and configured to, when the vehicle is traveling, control the control target to allow the margin estimated by the estimator to exceed a predetermined level.

5 Claims, 8 Drawing Sheets

(56) References Cited

U.S. PATENT DOCUMENTS

| | | | | |
|---|---|---|---|---|
| 2007/0129867 A1* | 6/2007 | Huang | ................. | B60W 30/04 |
| | | | | 701/1 |
| 2007/0247964 A1* | 10/2007 | Ross | ........................ | B60P 3/16 |
| | | | | 366/61 |
| 2008/0208416 A1* | 8/2008 | Yuet | ...................... | B60W 30/04 |
| | | | | 340/440 |
| 2012/0185136 A1* | 7/2012 | Ohnuma | ............... | B60W 30/04 |
| | | | | 701/70 |
| 2013/0328675 A1* | 12/2013 | Roach | .................... | B60T 17/22 |
| | | | | 340/453 |
| 2014/0081542 A1* | 3/2014 | Yao | ..................... | B60W 40/105 |
| | | | | 701/124 |
| 2015/0217778 A1* | 8/2015 | Fairgrieve | .............. | B62D 15/02 |
| | | | | 701/37 |
| 2016/0356370 A1* | 12/2016 | Richards | ............. | B60W 10/184 |
| 2018/0001887 A1* | 1/2018 | Watanabe | ........... | B60W 30/025 |
| 2018/0056985 A1* | 3/2018 | Coulter | ................ | B60K 7/0007 |
| 2018/0265076 A1* | 9/2018 | Hall | ...................... | B60W 10/06 |
| 2019/0049968 A1* | 2/2019 | Dean | ..................... | G06V 20/58 |
| 2019/0155285 A1* | 5/2019 | Wang | ................... | G05D 1/0055 |
| 2020/0032488 A1* | 1/2020 | Kean | ................... | B60W 50/08 |
| 2020/0094851 A1* | 3/2020 | Smye-Rumsby | ..... | B60W 50/14 |
| 2020/0172087 A1* | 6/2020 | Shur | ..................... | E02F 9/2025 |
| 2021/0107476 A1* | 4/2021 | Cui | ................. | B60W 60/00276 |
| 2021/0293575 A1* | 9/2021 | Arcos | .................. | G07C 5/0841 |
| 2022/0130181 A1* | 4/2022 | Li | ....................... | B60C 23/0479 |

OTHER PUBLICATIONS

Heavy Vehicle State Estimation and Rollover Risk (Year: 2007).*
Model Predictive Control of Vehicle Roll-Over (Year: 2018).*

* cited by examiner

ROUGH TERRAIN VEHICLE AND STORAGE MEDIUM

BACKGROUND

Technical Field

Aspects of the present disclosure relate to a rough terrain vehicle and a non-transient storage medium storing a program for controlling the operation of at least one control target during travel of a rough terrain vehicle.

Description of the Related Art

Rough terrain vehicles for travel on so-called rough terrain which refers to uneven, unpaved ground are adapted to move on various kinds of terrains or ground surfaces and are used in different ways by different users.

SUMMARY

A rough terrain vehicle according to an aspect of the present disclosure includes: a vehicle body; a state detector mounted on the vehicle body and configured to detect a state of the vehicle; a control target mounted on the vehicle body and operable during driving of the vehicle; an estimator mounted on the vehicle body and configured to estimate a margin for overturning of the vehicle or for load on the vehicle based on a result of detection by the state detector; and a controller mounted on the vehicle body and configured to, when the vehicle is traveling, control the control target to allow the margin estimated by the estimator to exceed a predetermined level.

In the above configuration, the rough terrain vehicle can keep traveling with the margin for overturning of the vehicle or for load on the vehicle being above the predetermined level. This makes it possible to prevent the vehicle from overturning or being damaged due to excessive load.

The above and further objects, features and advantages of the present disclosure will be more apparent from the following detailed description of exemplary embodiments with reference to the accompanying drawings.

DETAILED DESCRIPTION OF THE EMBODIMENTS

Hereinafter, exemplary embodiments will be described with reference to the drawings.

Embodiment 1

Figure 1:
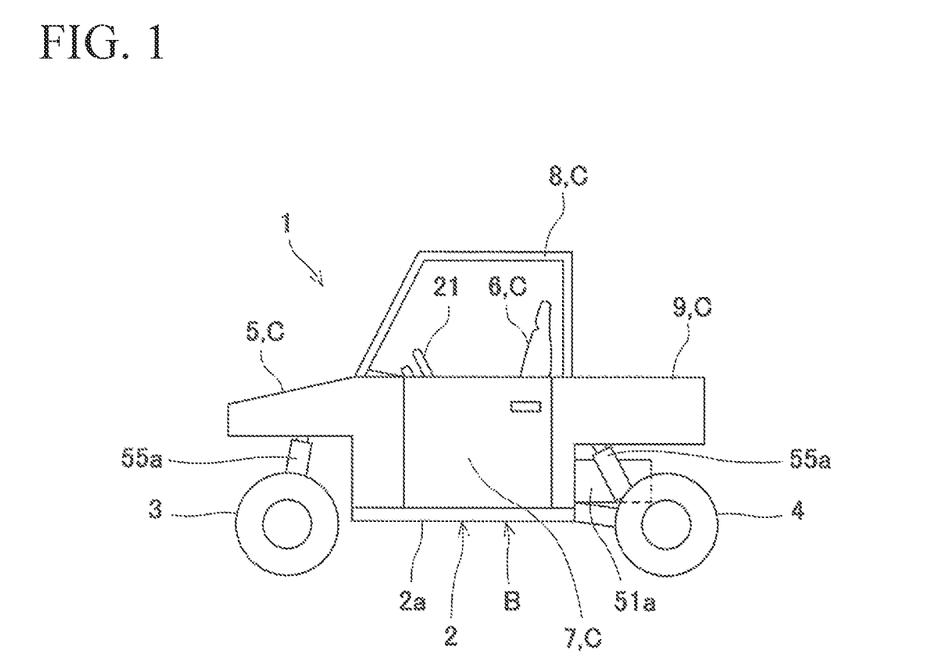
FIG. 1 is a schematic left side view of a rough terrain vehicle according to Embodiment 1.

FIG. 1 is a schematic left side view of a rough terrain vehicle 1 according to Embodiment 1. The rough terrain vehicle 1 is used for travel on so-called rough terrain which refers to uneven, unpaved ground. In the present embodiment, a utility vehicle is illustrated as an example of the rough terrain vehicle 1. In the following description, the rough terrain vehicle 1 may be simply referred to as the "vehicle 1". As shown in FIG. 1, the vehicle 1 includes a vehicle body 2, a pair of left and right front wheels 3 supporting the front of the vehicle body 2, and a pair of left and right rear wheels 4 supporting the rear of the vehicle body 2. The tires used in the front and rear wheels 3 and 4 are balloon tires for travel on rough terrain. A pair of front drive shafts (not shown) extending in the leftward-rightward direction are coupled to the pair of front wheels 3, respectively. A pair of rear drive shafts (not shown) extending in the leftward-rightward direction are connected to the pair of rear wheels 4, respectively.

The vehicle body 2 is equipped with a drive power generator 51a serving as a drive source for travel of the vehicle 1. The drive power generator 51a is, for example, an engine. Rotational power coming from the drive power generator 51a is transmitted to the pair of front drive shafts through a front wheel differential which is a mechanism for permitting the two front wheels 3 to rotate at different speeds. The rotational power coming from the drive power generator 51a is transmitted to the pair of rear drive shafts through a rear wheel differential which is a mechanism for permitting the two rear wheels 4 to rotate at different speeds.

The vehicle body 2 includes a base frame 2a. The base frame 2a includes a pipe frame made up of a plurality of pipes connected together. The base frame 2a is supported by the front and rear wheels 3 and 4, with suspension structures 55a interposed between the base frame 2a and the wheels 3 and 4. The base frame 2a supports a hood 5, a pair of occupant seats 6, a pair of doors 7, a cabin frame 8, and a cargo carrier 9. The hood 5 is made of resin and covers the space between the left and right front wheels 3 from above. The two occupant seats 6 are located behind the hood 5 and arranged side-by-side. The two doors 7 are located outward, respectively, of the two occupant seats 6 in the leftward-rightward direction. The cabin frame 8 is constructed to surround a cab (occupant compartment) in which the occupant seats 6 are disposed. The cargo carrier 9 is located behind the occupant seats 6. The cargo carrier 9 defines a recessed cargo-carrying space to accommodate cargoes.

Figure 2:
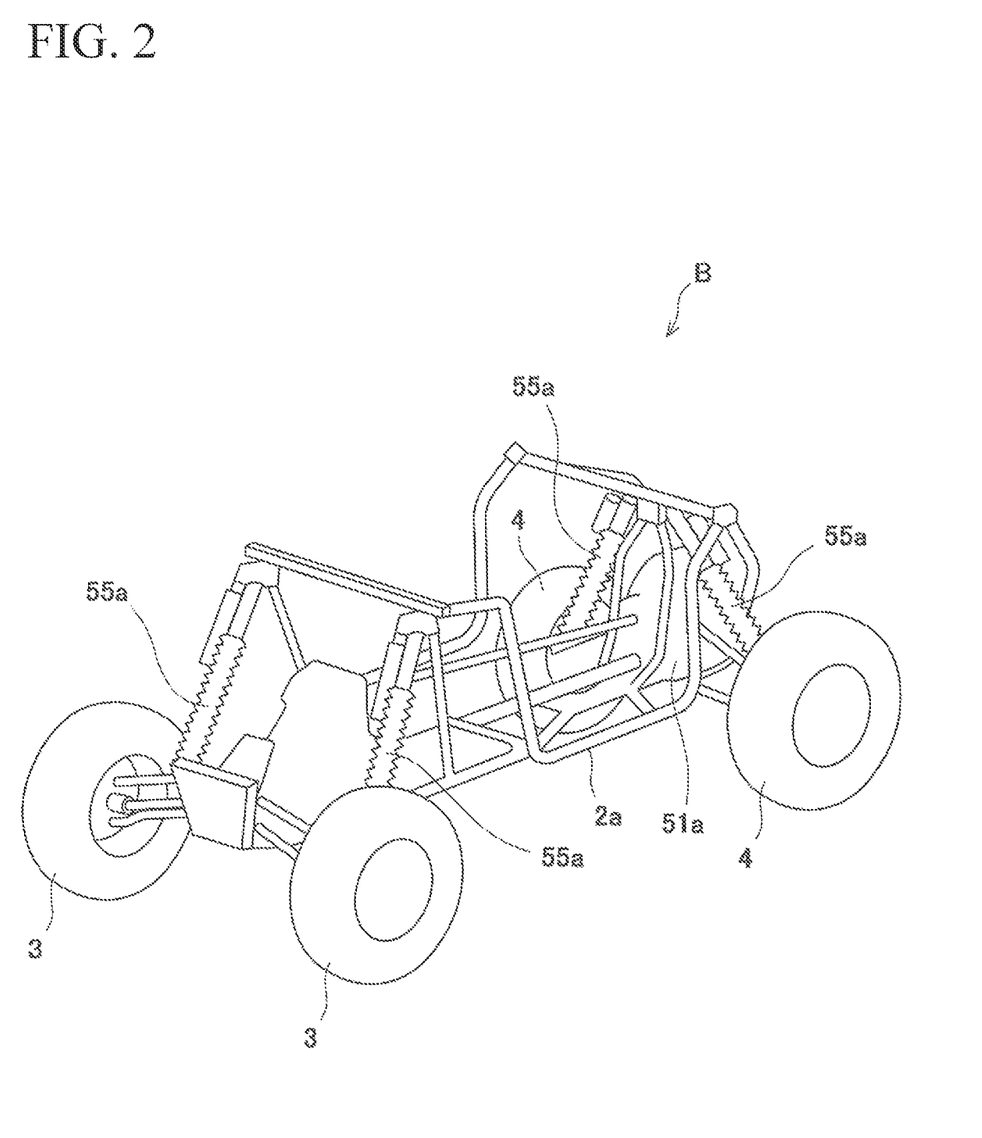
FIG. 2 is a schematic perspective view of a base assembly of the rough terrain vehicle of FIG. 1.

In the present embodiment, some parts of the vehicle 1 are customizable. The vehicle 1 includes a base assembly B having a basic structure for travel and customization parts C which may be combined with the base assembly B depending on the preference of the user. FIG. 2 is a schematic perspective view showing an example of the base assembly B of the vehicle 1 of FIG. 1. The base assembly B includes the base frame 2a, the pair of front wheels 3, the pair of rear wheels 4, and the suspension structures 55a. The base assembly B includes an engine serving as the drive power generator 51a. The hood 5, the pair of occupant seats 6, the pair of doors 7, the cabin frame 8, and the cargo carrier 9 are all customization parts C.

The customization parts C to be combined with the base assembly B can be chosen by the user according to his/her needs. This choice may be made, for example, before or after purchase of the vehicle 1. For example, when wanting to use the vehicle 1 for agricultural activities, the user may choose the cargo carrier 9 adapted for carrying crops as the customization part C. For example, when wanting to use vehicle 1 for sport driving, the user may choose the occupant seats 6 and hood 5 with maximally reduced weights as the customization parts C. For example, when wanting to remotely control the vehicle 1, the user may exclude the occupant seats 6 and cabin frame 8 from the customization parts C to be combined with the base assembly B.

The rough terrain vehicle 1 more often travels on bumpy ground than other kinds of vehicles for travel on paved or even roads. The use of the vehicle 1 can vary from user to user; for example, some users may use the vehicle 1 for agricultural activities, and other users may use the vehicle 1 for sport driving. The rough terrain vehicle 1 could be used for a purpose which is not envisaged by the developer. Further, some parts of the vehicle 1 may be customizable as described above. The present embodiment makes it possible to properly control a control target operable during driving of the vehicle 1 depending on how the user uses the vehicle 1, depending on the structural state of the vehicle 1, or depending on any other factor. The control of the control target will be described in detail later.

Figure 3:
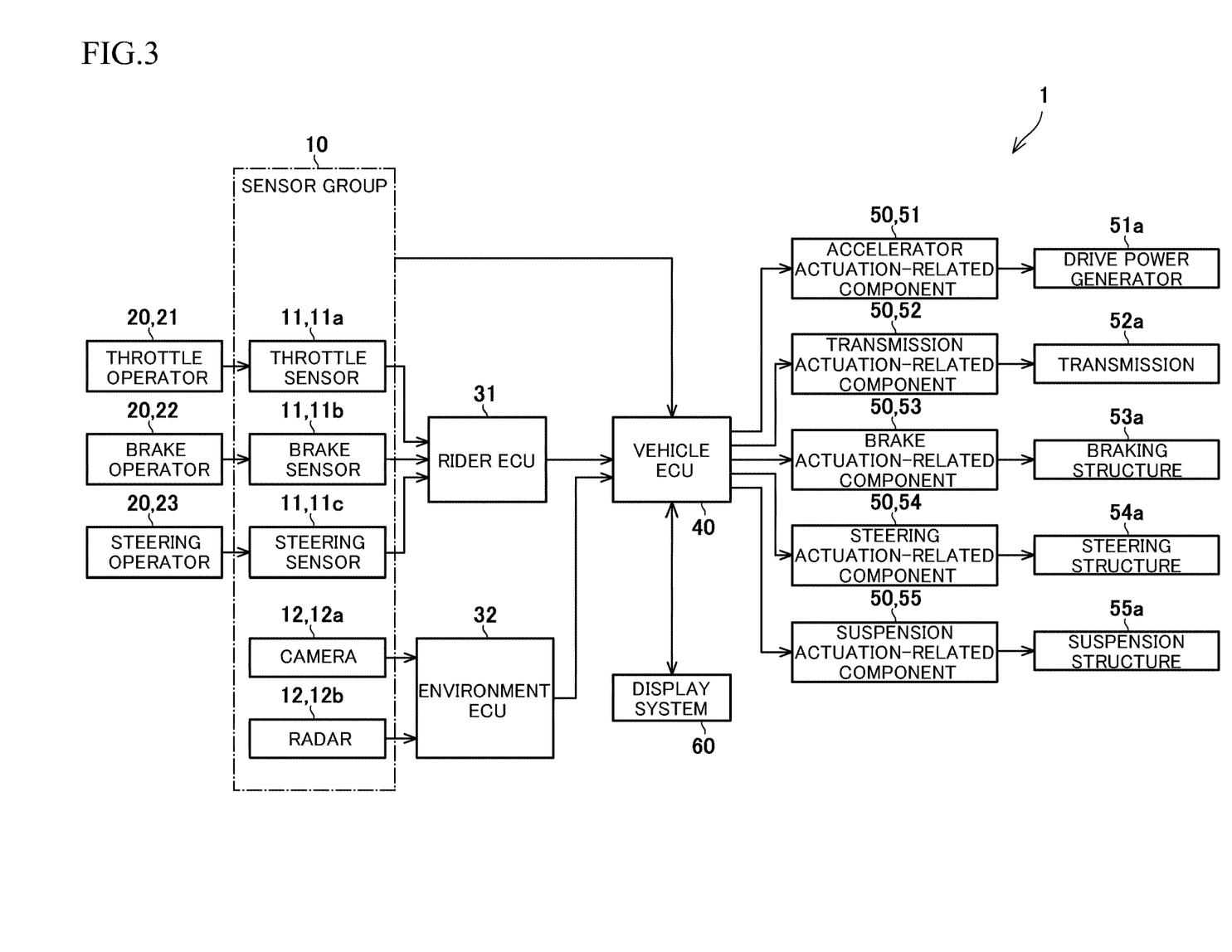
FIG. 3 is a block diagram showing a schematic configuration of the rough terrain vehicle of FIG. 1.
Figure 4:
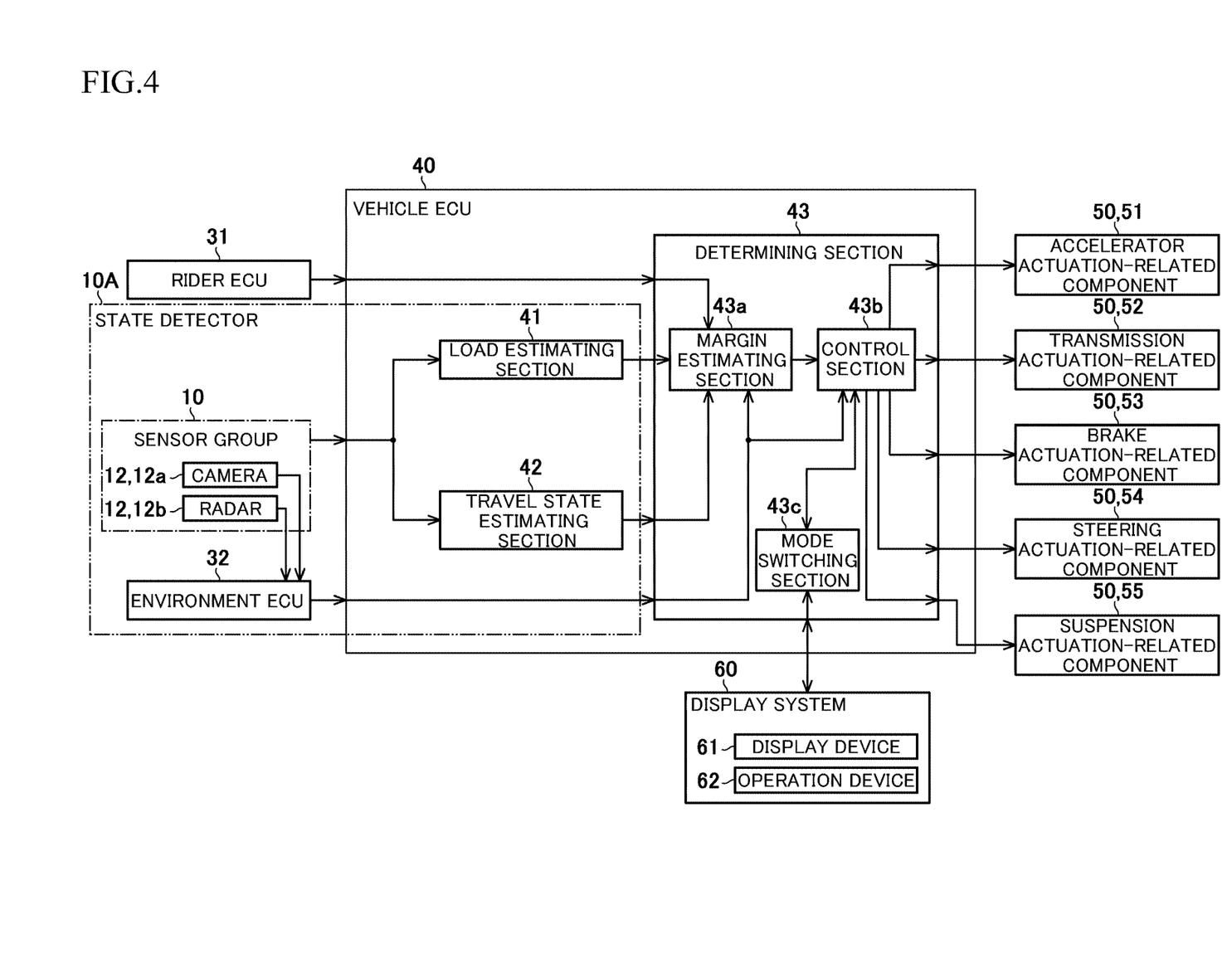
FIG. 4 is a block diagram showing a schematic configuration of a vehicle ECU shown in FIG. 3 and illustrating information exchange between the vehicle ECU and various other devices.
Figure 8:
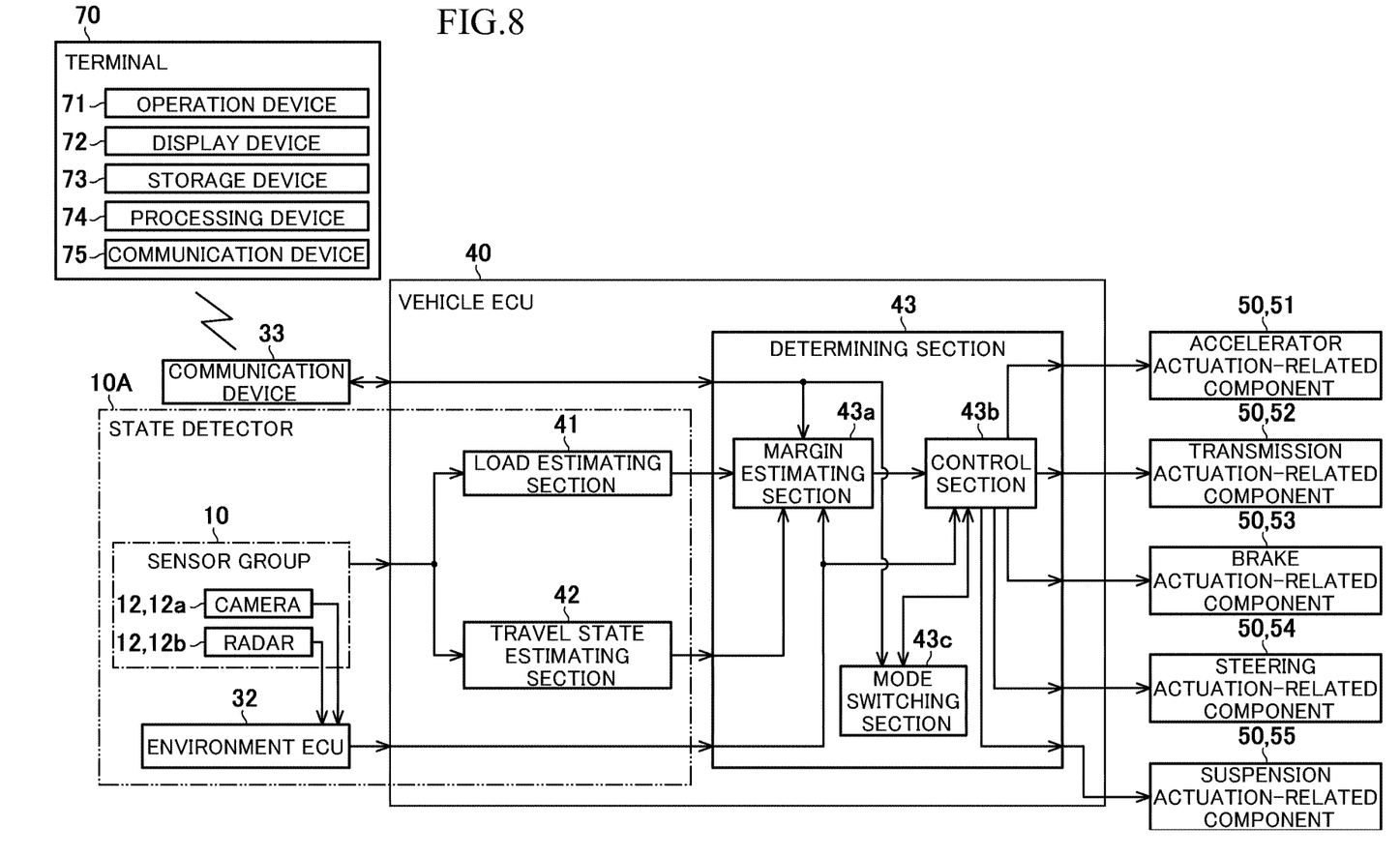
FIG. 8 is a block diagram showing a schematic configuration of a vehicle ECU of a rough terrain vehicle according to Embodiment 2 and illustrating information exchange between the vehicle ECU and various other devices.

FIG. 3 is a block diagram showing a schematic configuration of the vehicle 1 of FIG. 1. The vehicle body 2 of the vehicle 1 is equipped with many sensors. In the following description, the many sensors mounted on the vehicle 1 will be collectively referred to as a "sensor group 10". In FIG. 3 and FIGS. 4 and 8 which will be referred to later, the sensor group 10 is shown as a single block indicated by a dashed-dotted line for simplicity of the figures.

The sensor group 10 includes a plurality of operation amount detection sensors 11. The operation amount detection sensors 11 are for detecting the amounts of operations performed by the user on operators 20 described later. As shown in FIG. 3, the operation amount detection sensors 11 include a throttle sensor 11a, a brake sensor lib, and a steering sensor 11c.

The sensor group 10 includes a plurality of environment recognizing sensors 12. The environment recognizing sensors 12 are for detecting the state of the environment around the vehicle 1. The environment recognizing sensors 12 include a camera 12a and a radar 12b. The camera 12a captures images of obstacles ahead of the vehicle 1 and the ground surface on which the vehicle 1 is traveling. The captured images are subjected to image analysis to enable detection of the obstacles and identification of other entities such as letters or numbers of traffic signs. The radar 12b detects obstacles around the vehicle body 2. The radar 12b may be, for example, a millimeter-wave radar, an infrared radar, or a combination of these radars. The environment recognizing sensors 12 may, instead of including either or both of the camera 12a and the radar 12b, include another sensor such as an ultrasonic sensor which detects the state of the environment around the vehicle 1.

The sensor group 10 may further include other sensors in addition to the operation amount detection sensors 11 and environment recognizing sensors 12. The other sensors will be described later together with a state detector 10A.

The vehicle body 2 is equipped with the plurality of operators 20, a rider electronic control unit (ECU) 31, an environment ECU 32, a vehicle ECU 40, a plurality of control targets 50, and a display system 60.

The operators 20 are disposed in the cab and receive operations from the user. The operators 20 include a throttle operator 21, a brake operator 22, and a steering operator 23. The throttle operator 21 is, for example, an accelerator pedal. The brake operator 22 is, for example, a brake pedal. The steering operator 23 is, for example, a steering wheel.

The amount of an operation performed by the user on each operator 20 is detected by one of the operation amount detection sensors 11 that is associated with the operator 20. For example, the amount of the user's pressing on the accelerator pedal is detected by the throttle sensor 11a serving as one of the operation amount detection sensors 11. For example, the amount of the user's pressing on the brake pedal is detected by the brake sensor 11b which also serves as one of the operation amount detection sensors 11. For example, the amount of rotation of the steering wheel is detected by the steering sensor 11c which also serves as one of the operation amount detection sensors 11. The detections values of the operation amount detection sensors 11 are sent to the rider ECU 31.

The rider ECU 31 (request acquirer) includes, for example, a storage device storing various programs and a processing device for executing the programs stored in the storage device. The storage device includes, for example, a ROM and a RAM. The processing device includes, for example, a processor.

The rider ECU 31 acquires a request command indicating a vehicle body behavior requested by the user. That is, the rider ECU 31 acquires a request command as a function of the amounts of operations performed by the user on the operators 20. The rider ECU 31 sends the acquired request command to the vehicle ECU 40. Specifically, the rider ECU 31 receives detection values from the operation amount detection sensors 11, and sends the request command to the vehicle ECU 40 as a function of the received detection values. In the present embodiment, the request command is a command related to a throttle, brake, or steering operation. The request command may include the detection values themselves of the operation amount detection sensors 11 or command values generated as a function of the detection values.

As described above, the detection values of the operation amount detection sensors 11 are sent to the rider ECU 31, and the request command is sent from the rider ECU 31 to the vehicle ECU 40. Alternatively, the detection values of the operation amount detection sensors 11 may be sent directly to the vehicle ECU 40. The detection values of the operation amount detection sensors 11 may be used by the vehicle ECU 40 (in particular, a load estimating section 41, a travel state estimating section 42, and a determining section 43 which will be described later).

The environment ECU 32 includes, for example, a storage device storing various programs and a processing device for executing the programs stored in the storage device. The storage device includes, for example, a ROM and a RAM. The processing device includes, for example, a processor.

The environment ECU 32 generates information about obstacles around the vehicle body 2 (this information will hereinafter be referred to as "obstacle information") based on the detection values of the environment recognizing sensors 12. Specifically, the environment ECU 32 receives the detection values of the environment recognizing sensors 12, generates the obstacle information as a function of the received detection values, and sends the generated obstacle information to the vehicle ECU 40.

The obstacle information is, for example, information related to at least one of: the presence or absence of an obstacle around the vehicle body 2; the location of the obstacle relative to the vehicle body 2; the direction of the obstacle relative to the vehicle body 2; and the distance from the vehicle body 2 to the obstacle. For example, the environment ECU 32 performs image analysis of image data acquired by the camera 12a serving as one of the environment recognizing sensors 12, and thereby identifies an obstacle present in the captured image. The environment ECU 32 may identify letters or numbers of traffic signs through the image analysis of the image data acquired by the camera 12a. The environment ECU 32 acquires detection data related to the presence or absence of an obstacle and/or distance data related to the distance to the obstacle from the radar 12b serving as one of the environment recognizing sensors 12. Based on the acquired detection data and/or distance data, the environment ECU 32 identifies at least one of: the presence or absence of an obstacle around the vehicle body 2; the location of the obstacle relative to the vehicle body 2; the direction of the obstacle relative to the vehicle body 2; and the distance from the vehicle body 2 to the obstacle. The environment ECU 32 sends the obstacle information to the vehicle ECU 40.

As described above, the detection values of the environment recognizing sensors 12 are sent to the environment ECU 32, and the obstacle information is sent from the environment ECU 32 to the vehicle ECU 40. Alternatively, the detection values of the environment recognizing sensors 12 may be sent directly to the vehicle ECU 40. The detection values of the environment recognizing sensors 12 may be used by the vehicle ECU 40 (in particular, the load estimating section 41, travel state estimating section 42, and determining section 43 which will be described later).

The vehicle ECU 40 includes, for example, a storage device storing various programs and a processing device for executing the programs stored in the storage device. The storage device includes, for example, a ROM and a RAM. The processing device includes, for example, a processor. The vehicle ECU 40 receives the detection results from the sensor group 10, the request command from the rider ECU 31, and the obstacle information from the environment ECU 32. The vehicle ECU 40 generates control commands based on the received command and information. The vehicle ECU 40 sends the generated control commands to the control targets 50 and thereby controls the control targets 50. The details of the processing performed by the vehicle ECU 40 will be described later.

The control targets 50 are operated under control of the vehicle ECU 40 during driving of the vehicle 1. The control targets 50 include an accelerator actuation-related component 51, a transmission actuation-related component 52, a brake actuation-related component 53, a steering actuation-related component 54, and a suspension actuation-related component 55.

The accelerator actuation-related component 51 operates based on the control command received from the vehicle ECU 40 to control the drive power generator 51a that generates drive power of the vehicle 1, namely rotational power for driving the wheels 3 and 4. The drive power generator 51a is an internal combustion engine. The accelerator actuation-related component 51 includes, for example, a motor operable to open and close a throttle valve for regulating the amount of air taken into the engine, a fuel injector adjustable to vary the amount of fuel fed into the engine, and an ignition plug adjustable to vary the ignition time.

The transmission actuation-related component 52 operates based on the control command received from the vehicle ECU 40 to control a transmission 52a. The transmission 52a changes the speed of rotation produced from rotational power of the engine serving as the drive power generator 51a and transmits the resulting rotation to the drive shafts for driving the wheels 3 and 4. For example, the transmission actuation-related component 52 is a motor operable to rotate a shift drum for setting the gear selector of the transmission 52a into motion.

The brake actuation-related component 53 operates based on the control command received from the vehicle ECU 40 to control a braking structure 53a. The braking structure 53a includes front wheel brakes for the front wheels 3 and rear wheel brakes for the rear wheels 4. For example, the brake actuation-related component 53 is an actuator operable to actuate an oil control valve (OCV) disposed in a hydraulic passage leading from a hydraulic pump to a brake caliper.

The steering actuation-related component 54 operates based on the control command received from the vehicle ECU 40 to control a steering structure 54a. For example, the steering structure 54a includes a steering shaft. For example, the steering actuation-related component 54 is a motor operable to rotate the steering shaft.

The suspension actuation-related component 55 operates based on the control command received from the vehicle ECU 40 to control the electronically-controlled suspension structures 55a (see also FIGS. 1 and 2). For example, each suspension structure 55a may include: an arm structure connecting the front wheel 3 or rear wheel 4 to the vehicle body 2 in such a manner that the wheel is movable up and down relative to the vehicle body 2; and an absorber connecting the arm structure to the vehicle body 2 and electronically controllable to vary the damping coefficient. For example, the suspension actuation-related component 55 is an actuator operable to actuate a rotary valve for adjusting the damping force of the electronically controlled suspension structure.

Vehicle ECU

FIG. 4 is a block diagram showing the functional configuration of the vehicle ECU 40 shown in FIG. 3 and illustrating information exchange between the vehicle ECU 40 and various other devices. The vehicle ECU 40 includes a load estimating section 41, a travel state estimating section 42, and a determining section 43 as functional elements. The determining section 43 includes a margin estimating section 43a, a control section 43b, and a mode switching section 43c. Specifically, the storage device of the vehicle ECU 40 stores various programs such as a load estimation program, a travel state estimation program, a margin estimation program, and a control program. The processing device of the vehicle ECU 40 executes these programs stored in the storage device of the vehicle ECU 40 and thereby implements the functions of the load estimating section 41, travel state estimating section 42, margin estimating section 43a, control section 43b, and mode switching section 43c.

Load Estimation

The load estimating section 41 estimates the load on the vehicle 1 from the detection values of the various sensors included in the sensor group 10.

The load on the vehicle 1 is classified according to type. For example, the load on the vehicle 1 is classified into change in load imposed on the vehicle 1, impact load imposed on the vehicle 1, and cumulative load imposed on the vehicle 1.

The "change in load imposed on the vehicle 1" refers to a change per unit time in load or stress acting on a part of the vehicle 1. For example, the "change in load imposed on the vehicle 1" may include a change in load or stress which occurs in the vehicle body 2 due to a change in the travel state of the vehicle 1. For example, the "change in load imposed on the vehicle 1" may include a change in load or stress which occurs in the vehicle body 2 when the vehicle 1 is accelerating or decelerating or a change in load or stress which occurs in the vehicle body 2 when the vehicle 1 is turning a corner.

For example, the "change in load imposed on the vehicle 1" may include a change in load or stress which occurs in the vehicle body 2 when the vehicle 1 is at rest. Examples of the change in load or stress which occurs in the vehicle body 2 when the vehicle 1 is at rest include a change in load which occurs in the vehicle body 2 due to a change in structural state of the vehicle 1 or a change in load which occurs in the vehicle body 2 due to placement of a cargo onto the vehicle 1. Examples of the change in load which occurs in the vehicle body 2 due to a change in structural state of the vehicle 1 include a change in load imposed on a constituting element of the above-described base assembly B. Examples of the change in load on a constituting element of the base assembly B include that arising from mounting of a customization part C onto the base assembly B and that arising from replacement of one customization part C mounted on the base assembly B by another customization part C.

The "impact load imposed on the vehicle 1" refers to a load (degree of damage) imposed on a part of the vehicle 1 due to an external impact applied directly or indirectly to the part of the vehicle 1.

The "cumulative load imposed on the vehicle 1" refers to the total of loads which have been imposed on the entire vehicle 1 or a part of the vehicle 1 from a time point at which the vehicle 1 was in an initial state (e.g., a state where the total travel distance of the vehicle 1 is nearly zero). The "cumulative load imposed on the vehicle 1" can be paraphrased as "degree of fatigue" or "degree of load accumulation". The "cumulative load imposed on the vehicle 1" is classified, for example, into "environment-induced load", "thermal load", and "cyclic fatigue". The "environment-induced load" refers to a load imposed on (strength decrease occurring in) a part of the vehicle 1 due to a factor in the environment around the vehicle 1 or a change in the factor. Examples of the factor in the environment and its change include water impinging on the vehicle 1, the roughness of the ground surface, the temperature of the environment around the vehicle 1, and a change in the temperature. The "thermal load" refers to a load imposed on (strength decrease occurring in) a part (e.g., an engine) of the vehicle 1 due to heat generated in or externally applied to the part. The "cyclic fatigue" refers to the degree of fatigue (strength decrease) occurring in a part of the vehicle 1 due to repeated exposure to mechanical stress.

The load on the vehicle 1 is classified also according to the part subjected to the load. For example, the load on the vehicle 1 is classified into accelerator actuation-related component load, transmission actuation-related component load, brake actuation-related component load, steering actuation-related component load, suspension actuation-related component load, vehicle body load, and drive power transmission-related component load. The accelerator actuation-related component load refers to a load imposed on the accelerator actuation-related component 51, the transmission actuation-related component load refers to a load imposed on the transmission actuation-related component 52, the brake actuation-related component load refers to a load imposed on the brake actuation-related component 53, the steering actuation-related component load refers to a load imposed on the steering actuation-related component 54, and the suspension actuation-related component load refers to a load imposed on the suspension actuation-related component 55. The vehicle body load refers to a load imposed on the vehicle body 2. The drive power transmission-related component load refers to a load imposed on a drive power transmission-related component, examples of which include the front drive shafts coupled to the front wheels 3, the rear drive shafts coupled to the rear wheels 4, the front wheel differential, and the rear wheel differential.

The load estimating section 41 uses the detection values of the various sensors included in the sensor group 10 to estimate what kinds and amounts of loads have been or are currently imposed on the associated parts of the vehicle 1.

Figure 5A:
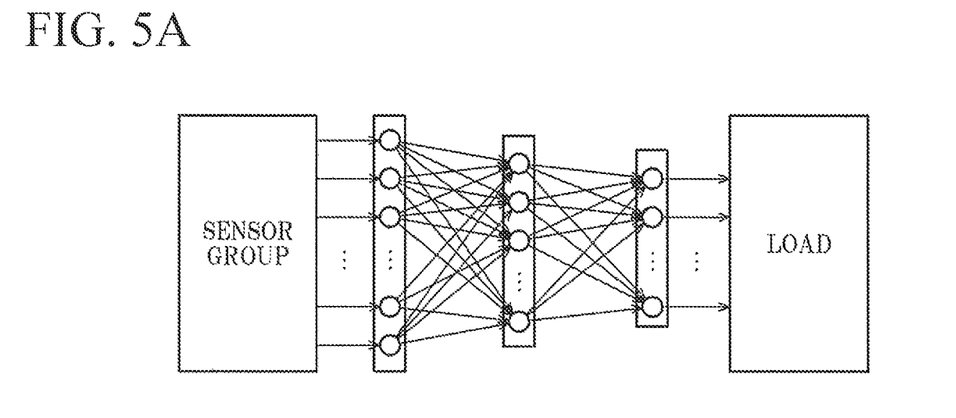
FIG. 5A illustrates a learned neural network for estimating load on the vehicle.

An example of how the load estimating section 41 estimates the load on the vehicle 1 will now be described with reference to FIG. 5A. FIG. 5A illustrates a learned neural network for outputting data related to the load on the vehicle 1 based on the detection values of the various sensors included in the sensor group 10. The detection value(s) of the sensor(s) will hereinafter be referred to as "sensor detection value(s)", and the neural network will hereinafter be referred to as "load estimation model". The data related to the load on the vehicle 1 includes, for example, the types and magnitudes of the loads. The learned load estimation model includes an input layer and an output layer. The sensor detection values are received as input data into the input layer, and the data related to the estimation value of the load on the vehicle 1 is output as output data from the output layer.

The load estimation model can be created through machine learning using as data for learning the sensor detection values acquired beforehand during travel of a test vehicle which is of the same model as the vehicle 1. This test vehicle will also be referred to as the "vehicle 1" hereinafter. More specifically, the vehicle 1 is allowed to travel in different situations by using various driving operations and ground surfaces, and the sensor detection values are acquired in the different situations. Further, load data related to loads imposed on the associated parts of the vehicle 1 at the time of acquisition of the sensor detection values is also obtained for each situation. The sensor detection values and load data associated with the different situations are used as the data for learning. The load data related to loads imposed on the associated parts of the vehicle 1 may include at least one of: data obtained from load sensors (such as a strain gauge) mounted on the vehicle 1 which was allowed to travel for acquisition of the data for learning; data obtained by a device capable of detecting damage to the associated parts of the vehicle 1; and a numerical parameter indicating a result of evaluation made for the degree of damage to the associated parts of the vehicle 1 by a person (such as the developer of the vehicle 1) who visually observed the associated parts after the vehicle 1 was allowed to travel. The load estimation values output from the output layer of the learned load estimation model depend on the data for learning. The units of the load estimation values are not limited to particular ones.

Travel State Estimation

The travel state estimating section 42 estimates the travel state of the vehicle 1 from the detection values of the various sensors included in the sensor group 10.

The travel state of the vehicle 1 is classified according to the driving operation performed on the vehicle 1. For example, the travel state of the vehicle 1 is classified into different states depending on which of the following operations (a1) to (a8) is being performed on the vehicle 1.

(a1) Acceleration operation
(a2) Deceleration operation
(a3) Steady-speed travel operation
(a4) Brake operation
(a5) Gear shifting operation
(a6) Turning operation
(a7) Lighting operation
(a8) Travel mode switching operation (such as operation for switching between two-wheel-drive and four-wheel-drive modes, operation for switching between locking and unlocking of the differentials, operation for setting of the antilock brake system (ABS), operation for output mode switching of the engine, or operation for mode switching of the suspension structure)

The travel state of the vehicle 1 is classified also according to the ground surface on which the vehicle 1 is traveling. For example, the travel state of the vehicle 1 is classified into different states depending on in which of the following travel fields (b1) to (b5) the vehicle 1 is traveling.

(b1) Paved road
(b2) Dune
(b3) Open desert
(b4) Rock section
(b5) Acrobatic driving field The "paved road" refers to a relatively even, paved ground surface. The "dune" refers to a dune area. The "open desert" refers to a broad wild land or desert made up of rocks, sand, and pebbles. The "rock section" refers to, for example, a field strewn with stones and rocks having a size in the order of several tens of centimeters. The "acrobatic driving field" refers to a field adapted for acrobatic driving, and an example of such a field is one provided with specific equipment such as a jumping ramp for jumping of the vehicle 1. The travel field categories into which the traveled grand surface is classified may include other travel fields falling outside the categories of the fields (b1) to (b5) and may include ground surface states different from those of the fields (b1) to (b5). Examples of the other travel fields include "mud", "forest", "mountain", and "water crossing".

The travel state of the vehicle 1 may, in addition to or instead of the above-described travel states defined based on the types of the performed operation and traveled ground surface, include travel states defined from another perspective.

The travel state estimating section 42 estimates which travel state the vehicle 1 is in from the detection values of the various sensors included in the sensor group 10.

Figure 5B:
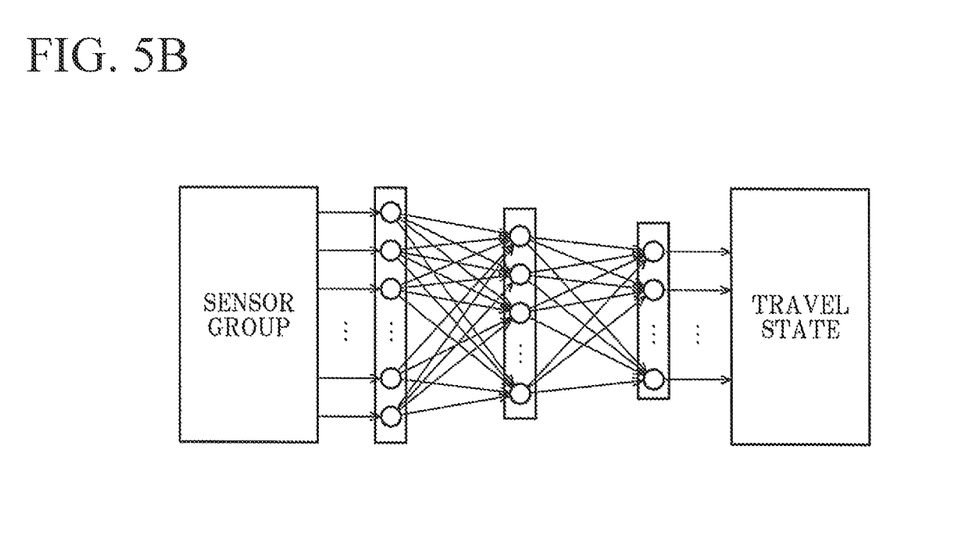
FIG. 5B illustrates a learned neural network for estimating the travel state of the vehicle.

An example of how the travel state estimating section 42 estimates the travel state of the vehicle 1 will now be described with reference to FIG. 5B. FIG. 5B illustrates a learned neural network for outputting the travel state of the vehicle 1 based on the sensor detection values. This neural network will hereinafter be referred to as "travel state estimation model". The learned travel state estimation model includes an input layer and an output layer. The sensor detection values are received as input data into the input layer, and the estimated travel state of the vehicle 1 is output as output data from the output layer.

The travel state estimation model can be created through machine learning using as data for learning the sensor detection values acquired during travel of a test vehicle which is of the same model as the vehicle 1. This test vehicle will also be referred to as the "vehicle 1" hereinafter. More specifically, the vehicle 1 is allowed to travel in different situations by using various driving operations and ground surfaces, and the sensor detection values are acquired in the different situations. Further, load data related to loads imposed on the associated parts of the vehicle 1 at the time of acquisition of the sensor detection values is also obtained for each situation. The sensor detection values and load data associated with the different situations are used as the data for learning.

The estimation of the load on the vehicle 1 by the load estimating section 41 and the estimation of the travel state of the vehicle 1 by the travel state estimating section 42 are not limited to the above-described methods using machine learning. For example, the load estimating section 41 may use pre-created mapping data representing the correspondence relationship between the sensor detection values and the load. The travel state estimating section 42 may use pre-created mapping data representing the correspondence relationship between the sensor detection values and the travel state.

State Detector

Referring back to FIG. 4, the load estimating section 41 estimates what kind of load is being or has been imposed on the vehicle 1. The travel state estimating section 42 estimates the travel state of the vehicle 1 as described above. The environment ECU 32 identifies the state of the environment around the vehicle body 2. Each of the various sensors included in the sensor group 10 detects the state of the associated part of the vehicle 1 or the state of the region around the associated part. In the following description, the load estimating section 41, the travel state estimating section 42, the environment ECU 32, and the various sensors included in the sensor group 10 will be collectively referred to as a "state detector 10A" configured to detect the state of the vehicle 1. In FIG. 4, the state detector 10A is shown by a dashed-double dotted line.

The state detector 10A includes various sensors for detection of the state of the vehicle 1. For example, the sensor group 10 includes a sensor for detecting the travel distance of the vehicle 1, a sensor for detecting the travel speed of the vehicle 1, a sensor for detecting a change in travel speed of the vehicle 1, a sensor for detecting the rotational speed of a drive source mounted on the vehicle 1, a sensor for detecting a change in rotational speed of the drive source, sensors for detecting the respective wheel speeds of the front and rear wheels 3 and 4, and sensors for detecting changes in wheel speed of the front and rear wheels 3 and 4.

For example, the state detector 10A may detect the state of the position of the vehicle body 2 as an indicator of the state of the vehicle 1. For example, the state detector 10A may detect changes in position of the vehicle body 2 in the pitch, roll, and yaw directions. For example, the state detector 10A may include an inertial measurement unit (IMU) that detects the acceleration of the vehicle 1 in the forward-rearward direction (forward-rearward acceleration), the acceleration of the vehicle 1 in the leftward-rightward direction (lateral acceleration), the acceleration of the vehicle 1 in the upward-downward direction (upward-downward acceleration), and the angular velocities of the vehicle body 2 in the pitch, roll, and yaw directions.

For example, the state detector 10A may detect the state of the environment around the vehicle body 2 as an indicator of the state of the vehicle 1. For example, the state detector 10A may include a sensor for detecting the ambient temperature or a sensor for detecting the ambient pressure.

For example, the state detector 10A may detect the structural state of the vehicle 1 or the state of a cargo carried on the vehicle 1 as an indicator of the state of the vehicle 1. For example, the state detector 10A may include a strain gauge or a weight scale. For example, the load estimating section 41 of the state detector 10A may estimate the structural state of the vehicle 1 or the state of a cargo carried on the vehicle 1 by detecting a change in suspension stroke when the vehicle 1 is at rest or by detecting the control effect of the brake operation, the position of the vehicle body 2, or a change in suspension stroke when the vehicle 1 is traveling.

The state detector 10A may include other sensors for detecting the engine speed, the throttle position, the amount of fuel injection, the gear ratio, engagement/disengagement of the clutch, the amount of clutch operation, locking/unlocking of the differentials, and occurrence/non-occurrence of drive wheel switching, respectively. The ECUs mounted on the vehicle 1 may be included in the state detector 10A.

As described, the state detector 10A uses various sensors and estimation means selectively to detect the state of the environment around the vehicle body 2, the state of obstacles around the vehicle body 2, the state of the ground surface around the vehicle body 2, the structural state of the vehicle 1, the state of a cargo carried on the vehicle 1, and the state of the position of the vehicle body 2.

Determining Section

The results of estimation by the load estimating section 41 and the travel state estimating section 42 are used by the determining section 43. Based on the results of estimation by the load estimating section 41 and the travel state estimating section 42, the determining section 43 generates a control command to be sent to the control target 50 to prevent the vehicle 1 from being overturned or being damaged due to excessive load. For example, when the vehicle 1 is traveling, the determining section 43 estimates the stability of the vehicle 1 in the travel state estimated by the travel state estimating section 42, and computes the control command such that the stability is above a predetermined level. For example, the determining section 43 computes the control command such that the vehicle load estimated by the load estimating section 41 is below a predetermined level.

The determining section 43 includes the margin estimating section 43a, the control section 43b, and the mode switching section 43c. In the present embodiment, the margin estimating section 43a functions as the "estimator" as defined in the claims of the present disclosure, and the control section 43b functions as the "controller" as defined in the claims of the present disclosure. That is, in the present embodiment, one processing device included in the vehicle ECU 40 functions both as the estimator that estimates a margin and as the controller that sends the control command to the control target 50 based on the estimated margin.

The margin estimating section 43a estimates a margin for load on the vehicle 1 (such as change in load on the vehicle 1) based on a result of detection by the state detector 10A (such as a result of estimation by the load estimating section 41). The "margin for load on the vehicle 1" is an indicator of the endurance of the vehicle 1 against the load on the vehicle 1. In other words, the "margin for load on the vehicle 1" is an indicator of the likelihood that the load on the vehicle 1 will cause serious damage to the vehicle 1 or the part subjected to the load. For example, a larger "margin for change in load on the vehicle 1" indicates that the vehicle 1 can more easily withstand the change in load (the vehicle 1 or the part subjected to the load is less likely to be seriously damaged). A smaller "margin for change in load on the vehicle 1" indicates that it is more difficult for the vehicle 1 to resist the change in load (the vehicle 1 or the part subjected to the load is more likely to be seriously damaged). The margin for load on the vehicle 1 includes at least one of a margin for load imposed on the vehicle body 2 (such as change in load imposed on the vehicle body 2), a margin for impact load imposed on the vehicle 1, and a margin for cumulative load imposed on the vehicle 1.

The margin estimating section 43a estimates a margin for overturning of the vehicle 1 based on a result of detection by the state detector 10A (such as the result of estimation by the travel state estimating section 42). The "margin for overturning of the vehicle 1" is an indicator of the stability of the vehicle 1, in particular the likelihood of overturning of the vehicle 1. A larger "margin for overturning of the vehicle 1" indicates a lower likelihood of overturning of the vehicle 1, while a smaller "margin for overturning of the vehicle 1" indicates a higher likelihood of overturning of the vehicle 1.

The margin estimating section 43a performs the margin estimation based on results of detection performed by the state detector 10A during or before travel. The storage device of the vehicle ECU 40 has stored the detection results obtained by the state detector 10A, and the margin estimating section 43a can use the results of detection performed by the state detector 10A in the past for the margin estimation. For example, the storage device of the vehicle ECU 40 has stored the cumulative load for each of the associated parts of the vehicle 1, and the load estimating section 41 updates the cumulative load values stored in the storage device for every estimation of the load occurring in the vehicle 1. When estimating the margin for cumulative load, the margin estimating section 43a performs the margin estimation based on the cumulative load stored in the storage device of the vehicle ECU 40 (i.e., cumulative load estimated by the load estimating section 41 in the past).

Figure 6A:
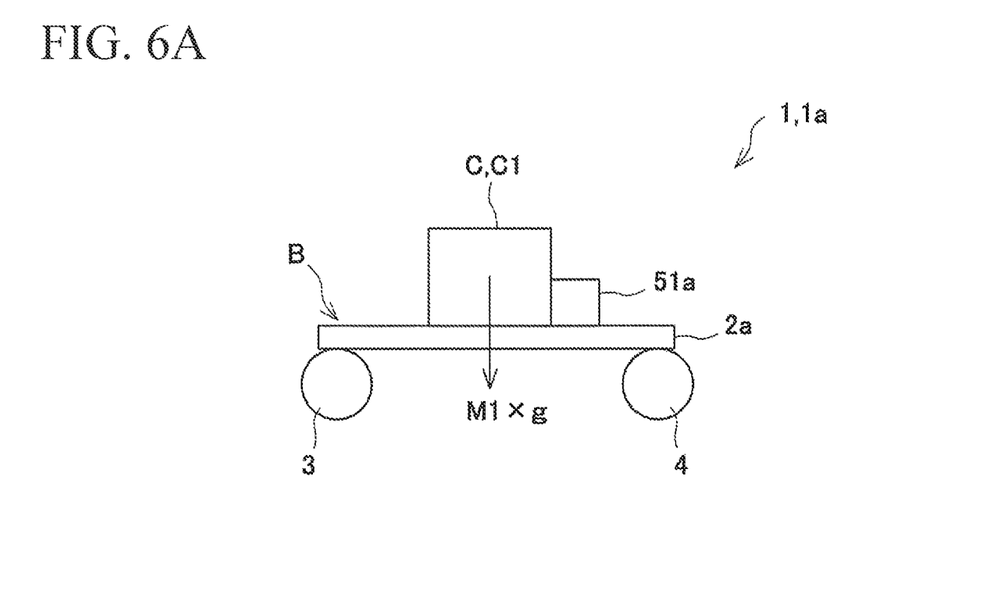
FIG. 6A is a model diagram of the rough terrain vehicle in which a customization part is mounted on the base assembly of FIG. 2.
Figure 6B:
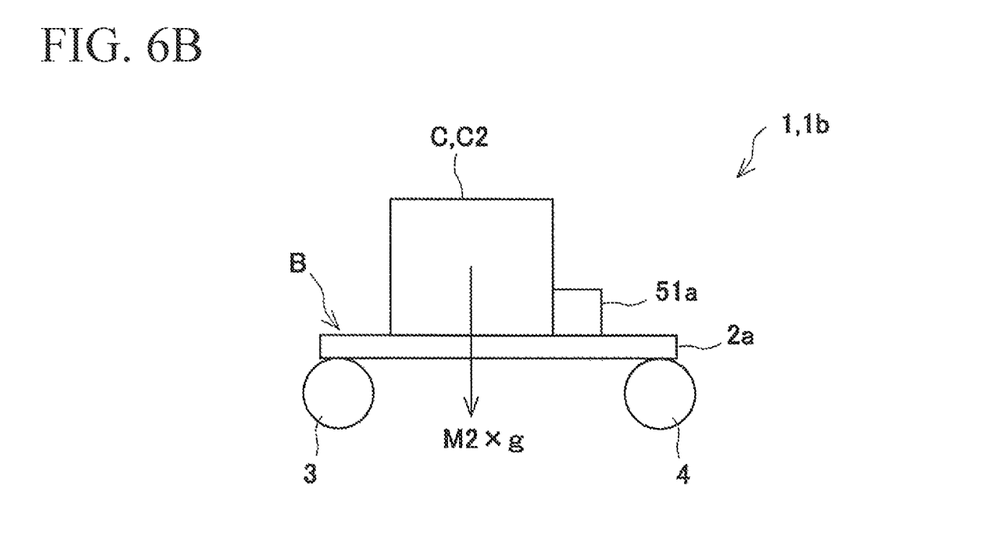
FIG. 6B is a model diagram of the rough terrain vehicle in which a customization part other than that of FIG. 6A is mounted on the base assembly of FIG. 2.

Example of Relationship Between Result of Detection by State Detector 10A and Estimated Margin An example of the relationship between a result of detection by the state detector 10A and the margin estimated by the margin estimating section 43a will be described with reference to FIGS. 6A, 6B, 7A, and 7B. FIG. 6A is a model diagram of a vehicle 1a in which a customization part C1 is mounted on the base assembly B of FIG. 2. FIG. 6B is a model diagram of a vehicle 1b in which another customization part C2 is mounted on the base assembly B of FIG. 2. The weight of the customization part C1 is denoted by M1, and the weight of the customization part C2 is denoted by M2. The user can choose a customization part C depending on his/her own preference, and the structural state-related properties such as the overall weight and the height of the center of gravity of the vehicle 1 can vary depending on the type of the customization part C mounted on the base assembly B. Thus, the load imposed on the parts of the base assembly B and the stability of the vehicle 1 during travel can vary depending on the type of the customization part C mounted on the base assembly B.

Figure 7A:
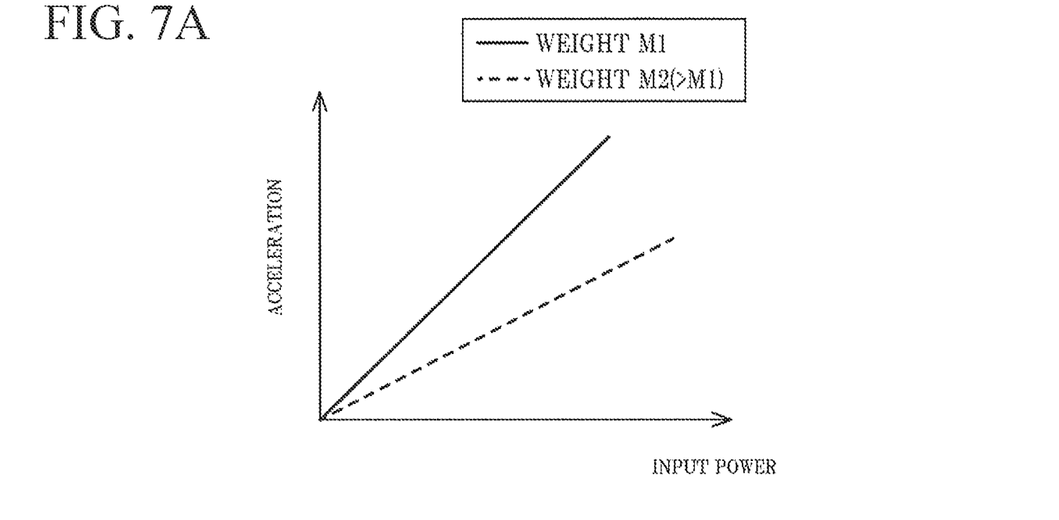
FIG. 7A is a graph showing the relationship of acceleration versus input power in the models of FIGS. 6A and 6B.
Figure 7B:
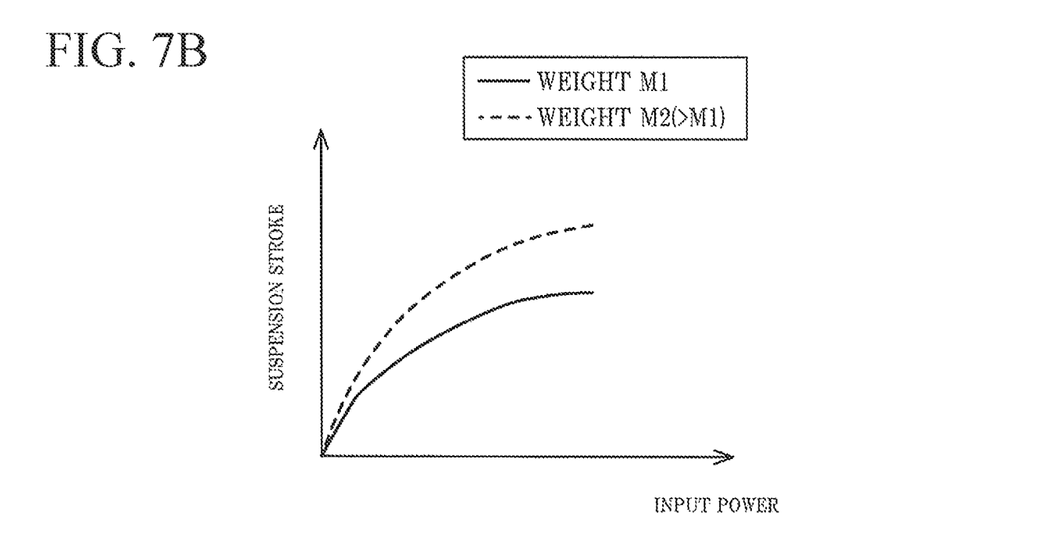
FIG. 7B is a graph showing the relationship of suspension stroke versus input power in the models of FIGS. 6A and 6B.

FIG. 7A is a graph showing the relationship of acceleration versus input power in the models of FIGS. 6A and 6B, and FIG. 7B is a graph showing the relationship of suspension stroke versus input power in the models of FIGS. 6A and 6B. In FIGS. 7A and 7B, the relationships are shown by solid lines for the vehicle equipped with the customization part C1 and by dashed lines for the vehicle equipped with customization part C2. As shown in FIG. 7A, the customization part C2 is heavier than the customization part C1, and the vehicle 1a equipped with the lighter customization part C1 exhibits a higher acceleration than the vehicle 1b equipped with the heavier customization part C2 in response to the same input power. As shown in FIG. 7B, the vehicle 1a equipped with the lighter customization part C1 exhibits a smaller suspension stroke amount than the vehicle 1b equipped with the heavier customization part C2 in response to the same input power. The motion behavior exhibited in response to the same input power can also vary depending on the type of the customization part C mounted on the base assembly B.

As described above, a change in structural state of the vehicle 1 involves a change in overall weight of the vehicle 1 or a change in location of the center of gravity of the vehicle 1, thus leading to a change in the behavior that the vehicle 1 exhibits in response to input power. This is the reason why the margin for overturning of the vehicle 1 and the margin for load on the vehicle 1 are estimated based on the results of detection as to the structural state of the vehicle 1.

While the above example is given to explain why the margin varies with change in structural state of the vehicle 1, similar consideration applies to the other detection results obtained by the state detector 10A. For the purpose of illustration, a situation where the vehicle 1 turns a sharp corner is discussed. In this situation, an effective way to prevent overturning of the vehicle 1 may be to limit the permissible range of the vehicle speed or the wheel steering angle before entry into the corner according to the state of the ground surface on which the vehicle 1 is traveling. Thus, the margin can vary depending on the state of the ground surface on which the vehicle 1 is traveling.

Referring back to FIG. 4, when the vehicle 1 is traveling, the control section 43b generates the control command such that the margin estimated by the margin estimating section 43a exceeds a predetermined level, and controls the control target 50 by sending the generated control command to the control target 50.

Specifically, the margin estimating section 43a estimates the margin based on the result of detection by the state detector 10A and the request command acquired by the rider ECU 31. Upon determining that the margin estimated based on the request command is above the predetermined level, the control section 43b uses the request command itself as the control command provided to the control target 50. This is because when the margin estimated based on the request command is above the predetermined level, the vehicle 1 is less likely to overturn or be damaged due to excessive load even with the use of the request command as the control command provided to the control target 50.

Upon determining that the margin estimated based on the request command is below the predetermined level, the control section 43b does not use the request command itself as the control command provided to the control target 50. This is because when the margin estimated based on the request command is below the predetermined level, the vehicle 1 may overturn or be damaged due to excessive load if the request command is used directly as the control command provided to the control target 50.

As described above, the control command provided to the control target 50 is restricted according to the estimated margin. There are several possible ways in which the control command restriction is accomplished when the margin is determined to be below the predetermined level.

Example 1 of Control Command Restriction Based on Margin

In an example of the control command restriction, upon determining that the margin estimated based on the request command is below the predetermined level, the control section 43b may leave the control command unchanged before and after reception of the request command and continue to provide the same control command to the control target 50 without reflecting any effect of the request command in the control command. For the purpose of illustration, a discussion is given of a situation where the vehicle ECU 40 receives from the rider ECU 31 a request command that the engine speed be controlled to X1 while the vehicle ECU 40 is sending to the control target 50 (the accelerator actuation-related component 51 in this example) a control command that the engine speed be controlled to X0 (X1>X0). In this situation, if the control section 43b determines that increasing the engine speed to X1 will cause the margin to fall below the predetermined level, the control section 43b may neglect the request command that the engine speed be changed to X1, and continue to send to the control target 50 the control command that the engine speed be controlled to X0.

Example 2 of Control Command Restriction Based on Margin

In another example of the control command restriction, upon determining that the margin estimated based on the request command is below the predetermined level, the control section 43b may correct the request command to allow the margin to exceed the predetermined level. In this case, the margin estimated based on the corrected request command is above the predetermined level. The control section 43b may use the corrected request command as the control command provided to the control target 50. For the purpose of illustration, a discussion is given of a situation where the vehicle ECU 40 receives from the rider ECU 31 a request command that the engine speed be controlled to X1. In this situation, if the control section 43b determines that controlling the engine speed to X1 will cause the margin to fall below the predetermined level, the control section 43b may correct the request command to allow the actual engine speed to become closer to (increase toward) the engine speed X1 specified by the uncorrected request command and remain within a range where the margin (as estimated based on the engine speed specified by the corrected request command) is above the predetermined level. The control section 43b uses the thus corrected request command as the control command provided to the control target 50.

While the above-described examples are those of restriction as to the control command related to the engine speed, similar consideration applies to the control commands related to the other parameters. For example, when a request command to sharply change the throttle position is sent to the vehicle ECU 40, the margin estimating section 43a estimates a margin for drive power transmission-related component load occurring in drive power transmission. Upon determining that the estimated margin is below a predetermined level, the control section 43b restricts the control command for the accelerator actuation-related component 51 to allow the margin to exceed the predetermined level. For example, when a request command to sharply turn the steering is sent to the vehicle ECU 40, the margin estimating section 43*a* estimates a margin for steering actuation-related component load or a margin for overturning induced by lateral acceleration of the vehicle 1. Upon determining that the estimated margin is below a predetermined level, the control section 43*b* restricts the control command for the steering actuation-related component 54 to allow the margin to exceed the predetermined level.

In generating the control command to be sent to the control target 50, the control section 43*b* takes into account not only the margin but also the obstacle information. In other words, the control section 43*b* controls the control target 50 not only to prevent the vehicle 1 from overturning or being damaged due to excessive load but also to prevent the vehicle 1 from colliding with nearby obstacles. For example, the control section 43*b* does not use the request command itself as the control command provided to the control target 50 upon determining that the vehicle 1 will collide with an obstacle if the request command is used directly as the control command provided to the control target 50 for control of the control target 50. Upon determining that the vehicle 1 will not collide with any obstacle, the control section 43*b* uses the request command itself as the control command provided to the control target 50.

The determination made by the control section 43*b* as to whether the margin is above the predetermined level may precede the determination made by the control section 43*b* based on the obstacle information as to the likelihood of the collision of the vehicle 1 with an obstacle, and vice versa. Depending on the result of the determination made first, the need for the other determination may be eliminated.

The mode switching section 43*c* switches the control mode of the control section 43*b* between a restriction mode in which the control section 43*b* performs the margin-based control command restriction and a non-restriction mode in which the control section 43*b* does not perform the margin-based control command restriction. The control mode switching by the mode switching section 43*c* can be effected by the user operating an operation device 62 described later.

Display System

The display system 60 includes: a display device 61 viewable by the user (rider) to notify the user of information; and an operation device 62 that receives operations from the user. These devices of the display system 60 are electrically connected to the vehicle ECU 40. The display device 61 and operation device 62 are disposed in the cab of the vehicle body 2. The display device 61 and operation device 62 may be integrated into a single unit (such as a touch screen) or may be separate from each other.

The vehicle ECU 40 sends the sensor detection values, the obstacle information, and the various estimation results to the display device 61. The display device 61 displays the detection values of the sensors included in the sensor group 10, the obstacle information generated by the environment ECU 32, and the results of estimation by the load estimating section 41 and travel state estimating section 42. When the margin is below the predetermined level, the display device 61 notifies the user that the request command is under restriction and not provided to the control target. Specifically, the vehicle ECU 40 sends mode information representing the present control mode of the control section 43*b* to the display device 61, and the display device 61 displays the present control mode of the control section 43*b*. Thus, the user can know from the displayed contents of the display device 61 whether the present control mode is the restriction mode. The user can switch the control mode of the control section 43*b* from the restriction mode to the non-restriction mode and vice versa by operating the operation device 62 while viewing the display device 61.

In the present embodiment, as described above, the margin estimating section 43*a* estimates the margin for load on the vehicle 1 based on a result of detection by the state detector 10A. When the vehicle 1 is traveling, the control section 43*b* generates the control command such that the margin estimated by the margin estimating section 43*a* exceeds the predetermined level, and sends the generated control command to the control target 50. This allows the vehicle 1 to keep traveling with the margin for load on the vehicle 1 being above the predetermined level, thus making it possible to prevent the vehicle 1 from being damaged due to excessive load.

The margin estimating section 43*a* further estimates the margin for overturning of the vehicle 1 based on a result of detection by the state detector 10A. When the vehicle 1 is traveling, the control section 43*b* generates the control command such that the margin estimated by the margin estimating section 43*a* exceeds the predetermined level, and sends the generated control command to the control target 50. This allows the vehicle 1 to keep traveling with the margin for overturning of the vehicle 1 being above the predetermined level, thus making it possible to prevent the vehicle 1 from overturning.

The state detector 10A detects the travel state of the vehicle 1 which is traveling, and the margin estimating section 43*a* performs the margin estimation based on the detected travel state of the vehicle 1. This facilitates estimation of the margin relevant to a possible future state of the vehicle 1 and leads to improved estimation accuracy.

The margin estimating section 43*a* performs the margin estimation using not only a result of detection by the state detector 10A but also the request command which is a result of acquisition by the rider ECU 31. Thus, whether the request command itself may be sent to the control target 50 without any restriction can easily be determined by taking into account what the margin would be if the request command was sent to the control target 50.

Upon determining that the margin is above the predetermined level, the control section 43*b* uses the request command received from the rider ECU 31 as the control command provided to the control target 50. This increases the frequency of events in which the vehicle 1 is operated based on the request command. Further, upon determining that the margin is below the predetermined level, the control section 43*b* restricts the request command and does not use the request command as the control command provided to the control target. This reliably prevents the request command from being sent as the control command to the control target 50 when the request command could cause decrease in the stability of the vehicle 1 or damage to the vehicle 1.

In the present embodiment, the control section 43*b* corrects the request command to allow the margin estimated by the margin estimating section 43*a* to exceed the predetermined level. Thus, the margin estimated by the margin estimating section 43*a* based on the corrected request command is above the predetermined level. The control section 43*b* controls the control target 50 by using the corrected request command as the control command provided to the control target 50. This makes it possible to render the control command provided to the control target 50 as close to the request command as possible while preventing the vehicle 1 from overturning or being damaged due to excessive load.

Embodiment 2

Hereinafter, the rough terrain vehicle 1 according to Embodiment 2 will be described with reference to FIG. 8.

FIG. 8 is a block diagram showing the schematic configuration of the vehicle ECU 40 of the rough terrain vehicle 1 according to Embodiment 2 and illustrating information exchange between the vehicle ECU 40 and various other devices. The following description of Embodiment 2 is given with focus on differences from Embodiment 1. The same or like elements are denoted by the same reference signs, and will not be described in detail.

In the present embodiment, the vehicle 1 is remotely controllable. In the present embodiment, the vehicle ECU 40 receives the request command from a terminal 70 external to the vehicle 1 rather than from the rider ECU 31. The terminal 70 may be, for example, a terminal carried by the user such as a smartphone, tablet terminal, or laptop computer or may be a device placed at a fixed location. For example, the terminal 70 may be disposed in the vehicle body 2.

The terminal 70 includes an operation device 71 that receives operations from the user, a display device 72 viewable by the user to notify the user of information, a storage device 73 storing various programs, a processing device 74 for executing the programs stored in the storage device 73, and a communication device 75. The operation device 71 of the terminal 70 may be, for example, a touch screen, mouse, or keyboard. The display device 72 of the terminal 70 may be, for example, a liquid crystal display. The storage device 73 includes, for example, a ROM and a RAM. The processing device 74 includes, for example, a processor. In the present embodiment, the vehicle 1 includes a communication device 33 electrically connected to the vehicle ECU 40. The communication device 33 of the vehicle 1 and the communication device 75 of the terminal 70 are transceivers capable of wirelessly transmitting and receiving various pieces of information to and from each other.

The storage device 73 stores an instruction application program by which instructions can be sent to the vehicle ECU 40. The processing device 74 executes the instruction application program to enable the communication device 75 to transmit to the communication device 33 a request command generated based on an operation performed by the user on the operation device 71.

The request command generated by the terminal 70 may be, for example, a command related to at least one of throttle, brake, and steering operations. The request command generated by the terminal 70 may include, for example, at least one of information related to the destination of the vehicle 1, information related to a scheduled time at which the vehicle 1 will arrive at the destination, information related to the travel route to the destination of the vehicle 1, information related to the speed of the vehicle 1, information related to the start and stop of travel of the vehicle 1, and information related to the moving direction of the vehicle 1.

The vehicle 1 may be remotely controlled based on operations performed by the user on the operation device 71. The communication device 33 receives the request command from the communication device 75 of the terminal 70. Thus, in the present embodiment, the communication device 33 serves as the request acquirer that acquires the request command indicating a requested vehicle body behavior. Upon receiving the request command from the communication device 75 of the terminal 70, the communication device 33 sends the received request command to the vehicle ECU 40.

In the vehicle ECU 40, the margin estimating section 43a performs the margin estimation based on the result of detection by the state detector 10A and the request command of the terminal 70. As in Embodiment 1, the control section 43b generates a control command such that the margin estimated by the margin estimating section 43a exceeds a predetermined level, and controls the control target 50 by providing the control command to the control target 50.

In the present embodiment, the terminal 70 serves the function of the display system 60; that is, when the margin is below the predetermined level, the terminal 70 notifies the user that the request command is under restriction and not provided to the control target. Specifically, the vehicle ECU 40 sends mode information representing the present control mode of the control section 43b to the terminal 70 via the communication devices 75 and 33, and the display device 72 displays the present control mode of the control section 43b. Thus, the user can know from the displayed contents of the display device 72 whether the present control mode is the restriction mode. The user can switch the control mode of the control section 43b from the restriction mode to the non-restriction mode and vice versa by operating the operation device 71 while viewing the display device 72.

The display device 72 may notify the user not only whether the control mode is the restriction or non-restriction mode but also what kind of restriction is imposed on the request command. For the purpose of illustration, a discussion is given of a situation where the vehicle ECU 40 receives from the terminal 70 a request command to "accelerate the vehicle", then the control section 43b determines that the margin estimated based on the request command is below the predetermined level and does not reflect any effect of the request command in the control command. In this situation, the vehicle ECU 40 sends request rejection information to the terminal 70 via the communication devices 75 and 33. The request rejection information is information indicating that the request command has been rejected. Based on the request rejection information, the display device 72 notifies the user of the rejection of the request command by displaying, for example, a text message such as "the vehicle was not able to be accelerated" or a sign such as that indicating "NG".

Other Embodiments

Many modifications and other embodiments of the present disclosure will be apparent to those skilled in the art from the foregoing description. Accordingly, the foregoing description is to be construed as illustrative only, and is provided for the purpose of teaching those skilled in the art the best mode for implementing the teachings of the present disclosure. The details of the structure and/or function may be varied substantially without departing from the scope of the disclosure.

For example, while in the above embodiments the processing device of the vehicle ECU 40 functions both as the estimator and as the controller, the estimator and the controller need not be embodied by a single processing device and may be separate from each other.

While the request acquirer that acquires a request command indicating a requested vehicle body behavior is the rider ECU 31 in Embodiment 1 and the communication device 33 in Embodiment 2, the request acquirer is not limited to the rider ECU 31 or the communication device 33. For example, the request acquirer may be a user interface (such as the display system 60 of Embodiment 1) which is disposed in the vehicle body 2. For example, when the vehicle 1 is equipped with a storage device storing an automatic driving program and a processing device for executing the automatic driving program, the processing device may function as the request acquirer by executing the automatic driving program and thereby acquiring automatic driving information as the request command. That is, the request command is not limited to a command generated based on an operation performed by the user, and may include a command generated based on the automatic driving program. Alternatively, a computing device may function as the request acquirer by computing the request command based on information received from the rider ECU 31 or the communication device 33.

While in the above embodiments the margin estimating section 43a performs the margin estimation based on the result of detection by the state detector 10A and the request command of the rider ECU 31 or terminal 70, the margin estimation need not be performed based on the detection result and the request command. For example, the margin estimation may be accomplished only based on the result of detection by the state detector 10A.

While in the above embodiments the notifier for notifying the user of information is the display device 61 or 72, the notifier is not limited to these display devices. For example, the notifier may be a sound output device such as a speaker disposed in the vehicle body 2 or a light emitting device such as a lamp disposed in the vehicle body 2.

The constituting elements of the base assembly B of the vehicle 1 are not limited to particular ones. For example, when the base assembly B is adapted to accommodate occupants, the base assembly B may include the operators 20 such as the steering wheel and the occupant seats 6. The operators 20 and the occupant seats 6 may be excluded from the base assembly B to allow for the use of the base assembly B in unmanned vehicles, and may be provided as the customization parts C.

The control targets 50 are not limited to those of the above embodiments either. For example, the control targets 50 need not include all of the accelerator actuation-related component 51, transmission actuation-related component 52, brake actuation-related component 53, steering actuation-related component 54, and suspension actuation-related component 55, and may include elements other than these actuation-related components 51 to 55. The accelerator actuation-related component 51 as the control target 50 may include the drive power generator 51a, the transmission actuation-related component 52 as the control target 50 may include the transmission 52a, the brake actuation-related component 53 as the control target 50 may include the braking structure 53a, the steering actuation-related component 54 as the control target 50 may include the steering structure 54a, and the suspension actuation-related component 55 as the control target 50 may include the suspension structure 55a. For example, the drive power generator 51a may be an electric motor rather than an engine. In this case, the drive power generator 51a itself may be the control target 50.

While in the above embodiments a utility vehicle is described as an example of the rough terrain vehicle 1, the rough terrain vehicle 1 may be a continuous track or wheeled rough terrain haulage vehicle, an agricultural tractor, or a traveling lawn mower.

The constituting elements of Embodiment 1, Embodiment 2, and the other embodiments can be combined in any suitable manner.

What is claimed is:

1. A rough terrain vehicle comprising:
a vehicle body;
a sensor group mounted on the vehicle body and configured to detect a state of the vehicle;
a control target mounted on the vehicle body and operable during driving of the vehicle; and
a processor mounted on the vehicle body, the processor being configured to:
estimate a margin for overturning of the vehicle or for load on the vehicle based on a result of detection by the sensor group; and
when the vehicle is traveling, control the control target to allow the estimated margin to exceed a predetermined level, wherein
the vehicle body includes an operator operable by a user,
the processor estimates the margin based on the result of detection by the sensor group and a result of acquisition of a request command indicating a requested vehicle body behavior, the request command being generated based on an operation performed by a user on the operator, and
upon determining that the estimated margin is below the predetermined level, the processor does not use the request command as a control command provided to the control target.

2. The rough terrain vehicle according to claim 1, wherein the request command specifies an engine speed or a throttle position,
upon determining that the margin is above the predetermined level, the processor uses the request command as the control command provided to the control target, and
upon determining that the margin is below the predetermined level, the processor does not provide the control command to the control target.

3. The rough terrain vehicle according to claim 1, wherein the request command specifies an engine speed or a throttle position,
upon determining that the margin is above the predetermined level, the processor uses the request command as the control command provided to the control target, and
upon determining that the margin is below the predetermined level, the processor does not use the request command as the control command provided to the control target but corrects the request command to allow the margin to exceed the predetermined level and uses the corrected request command as the control command provided to the control target.

4. The rough terrain vehicle according to claim 1, wherein the sensor group detects a structural state of the vehicle or a state of a cargo carried on the vehicle as an indicator of the state of the vehicle.

5. The rough terrain vehicle according to claim 1, wherein the sensor group includes an operation amount detection sensor configured to detect an amount of the operation performed by the user on the operator, and
the processor estimates a state of a ground surface on which the vehicle is traveling based on a detection value obtained by the operation amount detection sensor and estimates the margin by using the estimated state of the ground surface.

* * * * *